June 11, 1940.  G. C. BERRYMAN  2,204,468
METHOD OF FORMING PNEUMATIC TIRES
Filed July 21, 1936
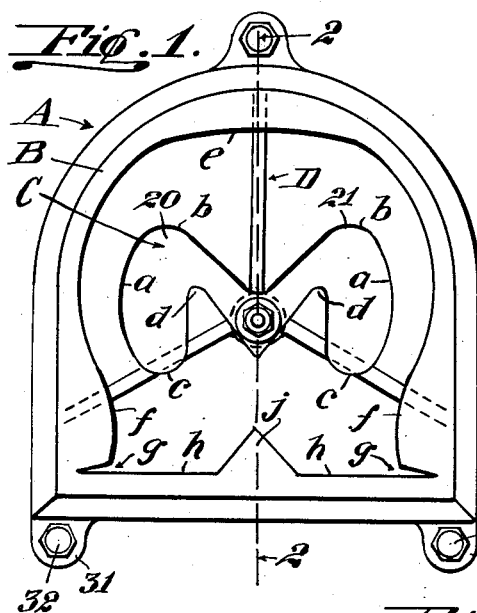
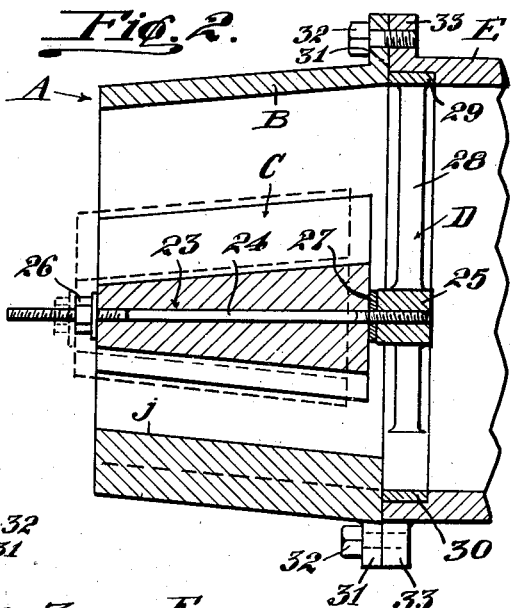
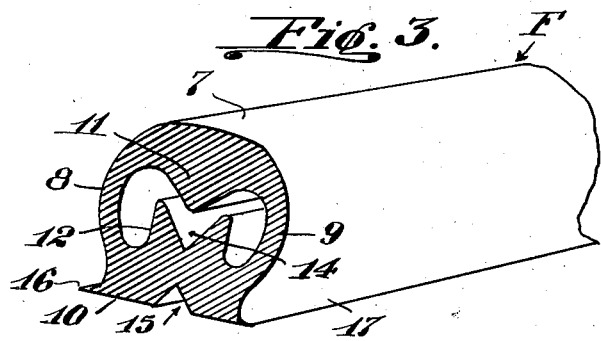
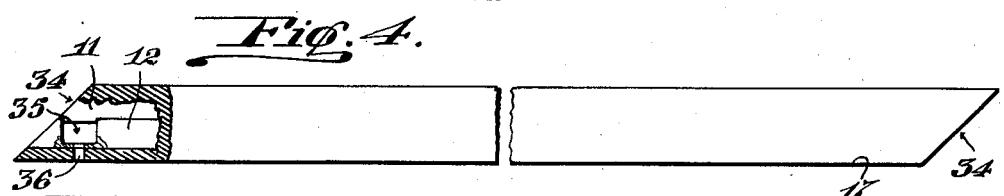
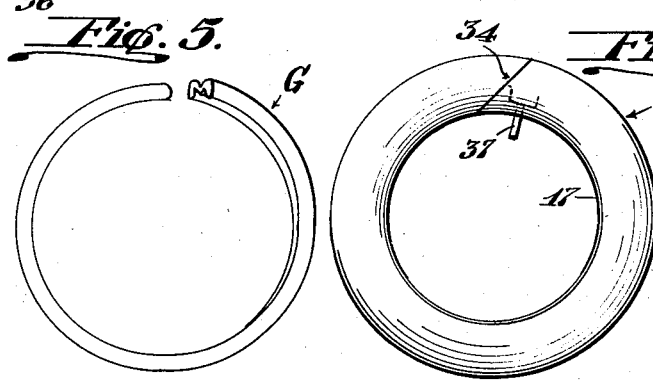
Inventor
Grover C. Berryman;
By
R. S. Berry
Attorney Patented June 11, 1940

2,204,468

UNITED STATES PATENT OFFICE 2,204,468

METHOD OF FORMING PNEUMATIC TIRES

Grover C. Berryman, Los Angeles, Calif.

Application July 21, 1936, Serial No. 91,693

3 Claims. (Cl. 18—53)

This invention relates to a means and method for forming pneumatic tires and more particularly pertains to a mode of forming an inflatable tube of the character set forth in my copending application for United States Letters Patent, Ser. No. 711,006, filed February 13, 1934.

An object of the invention is to provide an efficient and economical means and method for producing a continuous annular inflatable tube formed of rubber or rubber composition which is suitable for use as a vehicle tire, and which tube involves a tread portion, side wall portions, and an inner peripheral wall portion with spaced circumferentially extending ribs on the interior peripheries of the tread portion and the inner wall portion, and in which the tread portion, wall portions and ribs are unitarily and integrally formed of continuous cross section, and which unit is elastic and capable of free expansion throughout.

Another object is to provide a means and method for forming an annular tube of the above character such that the rubber tube may be formed through the medium of a conventional tube machine in a continuous straight strip of the tubing, in association with a mode of converting the straight tubing into an annulus of desired diameter. A further object is to provide a method of forming a tire of the character set forth whereby equipment of such tire with a valve stem is greatly facilitated.

With the foregoing objects in view together with such other objects and advantages as may subsequently appear, the invention is carried into effect in the manner depicted by way of example in the accompanying drawing, in which:

Fig. 1 is a view in front elevation of a tubular die applied to a tube machine and which die is formed to produce a substantially straight length of raw rubber tubing of required configuration in cross section;

Fig. 2 is a view in vertical section, partly in elevation, as seen on the line 2—2 of Fig. 1;

Fig. 3 is a view in section and perspective of a length of tubing formed by the die shown in Figs. 1 and 2;

Fig. 4 is a view in side elevation, with portions broken away, of a length of the straight tubing as formed preparatory to converting it into a tubular annulus;

Fig. 5 is a perspective view of a forming spiral utilized in initially imparting to the straight length of tubing shown in Fig. 4 an approximately circular formation;

Fig. 6 is a view in side elevation showing the manner of uniting the ends of a curved length of the tubing to form a tubular annulus.

Referring to the drawing more specifically, A indicates generally a die for forming a tube of rubber or rubber composition which die embodies a shell B, a core C, and a grid or spider D which are designed to be assembled on the discharge tube E of a conventional rubber tube forming machine.

In order to carry out the invention the die A is formed with a cross section such as to produce a tube F contoured as shown in Fig. 3, that is with a tread portion 7, side wall portions 8 and 9, and an inner peripheral wall portion 10, with circumferentially extending ribs 11 and 12 on the interior peripheries of the tread portion and inner wall portion respectively, and with the rib 12 formed with a peripheral channel 14 of V-shaped cross section and with the rib 11 formed of substantially V-shaped cross section and projecting into the channel 14 with its ridge and side wall portions spaced from the walls of the channel. The die is also formed to provide the tube F with a circumferentially extending channel 15 of V-shaped cross section circumferentially of the inner periphery of the inner wall portion 10, the peak portion of the channel is diametrically opposite the peak portion of the channel 14. The die is further formed to provide longitudinally extending and laterally projecting lips 16 and 17 at the intersection of the outer faces of the base portion of the side walls 8 and 9 with the opposite margins of the inner wall portion 10; the lips 16—17 thus extending along the margins of the inner periphery of the tube F. The lips are adapted to be turned to overlie the base portions of the side walls 8 and 9 to extend over and imbed reinforcement strips and to form rim engaging beads along the margins of the inner wall of the tube.

To accomplish the above purposes the core C of the die A is substantially M shaped in cross section, and includes side members 20 and 21 having opposed outer margins of arcuate contour as indicated at $a$ to form the inner surfaces of the walls 8 and 9 of the tube F; the outer and inner ends of the side members 20 and 21 also being arcuate in contour as indicated at $b$ and $c$ respectively to form rounded contours at the junctures of the ribs 11 and 12 and side walls 8 and 9. The central portion of the core C is of substantially V-shaped cross section with the upper margin thereof merging into the arcuate portion $b$ and with the lower portion connecting with a return bend $d$ leading to the arcuate margins $c$.

The central portion of the die is formed with a longitudinal bore 23 through which extends a stem 24 carried on a hub 25 on the spider D; the stem 24 being threaded at its outer end to receive a nut 26 for clamping the core against the hub 25 or against a shim 27 interposed between the inner end of the core and the hub.

The shell B is contoured to have an inner periphery including a transversely curved wall portion e which extends over the upper portion of the core C and along the arcuate faces a of the core in spaced relation thereto. The ends of the curved wall portion e merge into reverse curves f leading to channels g at the lower portion of the shell, which channels are contoured in cross section to form the lips 16 and 17 of the tube.

The lower inner margin of the shell includes flat faces h leading inwardly from the outer portions of the channels g to a central rib j of substantially triangular cross section for forming the tube F with flat faces on its under side extending between the lips 16 and 17 and the margins of the V-groove or channel 15.

As here shown the spider D includes radial arms 28 leading from the hub 25 and connecting with a ring 29 seated in a channel 30 on the interior of the outer end portion of the tube E, and the shell B is formed to seat at its inner end on the ring 29 and is provided with a series of lugs 31 which are engaged by bolts 32 with complementary lugs 33 on the end of the tube E to afford a demountable connection between the die and the tube.

The shell B and core C are tapered longitudinally with their large ends presented to the tube E so that the space between the shell and the core converges outwardly from its communication with the tube whereby adjusting the core C on the stem 24 as by varying the thickness of the shim 27 the wall thickness of the tube F may be varied; the maximum thickness of the tube F being attained when the core C is disposed in its innermost position and being rendered of lesser thickness on disposing the core with the enlarged end in an advanced position relative to the reduced forward end of the shell.

In initially forming the tube F a plastic composition such as rubber or rubber composition is forced from the tube mill in a usual fashion through the tube E and through the die A so as to form a length of tubing F contoured as shown in Fig. 3. The tubing thus initially formed is substantially straight but manifestly is quite flexible. In converting the straight tubing into an annulus a predetermined length of the raw rubber tube F is provided, namely of a length corresponding to the circumferential length of the desired annulus. This length of tube is formed as shown in Fig. 4, that is with its end portions cut on a bias with the opposite ends extending diagonally relative to the longitudinal axis of the tube on corresponding planes, as indicated at 34. On thus forming the ends of the tube a portion of the rib 12 is removed adjacent one end of the tube to form a recess 35 in the rib 12 and an opening 36 is formed in the bottom wall of the recess 35 to receive a valve stem 37 which manifestly may be inserted through the opening 36 from the interior of the tube. By thus forming the end of the tube on a bias access to the interior thereof to effect removal of a portion of the rib 12 to form the recess 35 is readily had.

The tube thus formed is then placed on a split ring G particularly shown in Fig. 5; the ends of which ring are silghtly off-set relative to each other whereby threading of the tube thereon is readily facilitated. The ring G is formed of a cross section conforming to the contoured interior of the tube. The tube is thus mounted on the spiral ring G while the plastic material of which it is formed is hot, yet uncured. The mounted tube is then allowed to cool as by permitting it to stand for approximately fifteen minutes at atmospheric temperature which cooling action serves to set the plastic. On the tube being sufficiently cool and set it is stripped from the ring G and will then be substantially circular in form.

The pneumatic valve stem 37 is then arranged to extend through the opening 36 with a flange on its inner end seating on the bottom of the recess 35 and the valve stem then securely fixed in place. The bias ends 34 of the tube are then cemented together by a suitable adhesive such as a raw rubber cement whereupon the tube is placed in a vulcanizing mold and inflated therein by forcing air through the pneumatic valve stem 37 under pressure whereupon the tube in the mold is subjected to a temperature to effect vulcanizing of the tube in a manner well known in the art. On thus vulcanizing the tube it is removed from the mold in the form of a finished product which however may be subjected to any suitable further treatment as occasion may require.

I claim:

1. The method of forming a resilient hollow tube consisting in forming a length of raw rubber tubing with internal ribs extending longitudinally thereof on its outer and inner wall portions, forming the ends of the tube and the ribs thereof on a bias, forming a recess in the rib on the inner wall portion adjacent to one biased end of the tube by removing a portion of the material of the rib, forming an opening leading through the bottom wall of the recess, placing the length of tubing on a split ring having a cross section contoured to correspond to the contour of the inner periphery of the tube while the material of the tube is hot and soft, allowing the tube to cool on the ring until the material thereof is set, then removing the tube from the ring, cementing the bias ends of the tube and ribs together, inflating the tube in a mold, and heating the mold to vulcanize the tube.

2. The method of forming a resilient hollow tube consisting in forming a length of raw rubber tubing with internal ribs extending longitudinally thereof on its outer and inner wall portions, forming the ends of the tube on a bias, removing a portion of the material of the rib on the inner wall portion to form a recess in the rib adjacent one end of the tube, forming an opening through the inner wall portion of the tube opposite said recess, mounting a tubular valve housing in said opening, uniting the bias ends of the tube together, inflating the tube, and then curing the tube while inflated.

3. The method consisting in forming a resilient hollow tube having an internal longitudinally extending rib, forming the ends of the tube on a bias to expose a portion of the top wall of the rib, removing a part of the exposed rib to form a recess therein, forming an opening through the bottom wall of the recess, and mounting a valve stem in said opening.

GROVER C. BERRYMAN.